United States Patent [19]
Felix et al.

[11] Patent Number: 5,966,384
[45] Date of Patent: Oct. 12, 1999

[54] METHOD AND APPARATUS FOR DATA TRANSMISSION WITHIN A BROAD-BAND COMMUNICATION SYSTEM

[75] Inventors: Kenneth A. Felix, Crystal Lake; Joseph Rinchiuso, Melrose Park, both of Ill.

[73] Assignee: Motorola, Inc., Schaumburg, Ill.

[21] Appl. No.: 09/074,816

[22] Filed: May 8, 1998

[51] Int. Cl.[6] .................................................. H04B 1/69
[52] U.S. Cl. .......................... 370/465; 370/209; 370/342
[58] Field of Search .................................... 370/335, 342, 370/465, 468, 431, 437, 209; 714/821; 710/22

[56] References Cited

U.S. PATENT DOCUMENTS

| | | | |
|---|---|---|---|
| 4,447,903 | 5/1984 | Sewerinson | 714/821 |
| 5,546,420 | 8/1996 | Seshadri et al. | 370/342 |
| 5,838,993 | 11/1998 | Riley | 710/22 |
| 5,907,582 | 5/1999 | Yi | 370/342 |

OTHER PUBLICATIONS

Steve Dennett, "The CDMA2000 ITU–R RTT Candidate Submission", Apr. 11, 1998, vo.16, pp. 112–147.

*Primary Examiner*—Chi H. Pham
*Assistant Examiner*—Maikhanh Tran
*Attorney, Agent, or Firm*—Kenneth A. Haas

[57] ABSTRACT

During data transmission to a remote unit (113) utilizing a supplemental, high-speed data channel (105), data transmission stops due to all data being communicated to the remote unit (113) or because of an interruption in transmission. In the situation where all data has been transmitted to the remote unit (113) the remote unit (113) will drop the supplemental channel (105) prior to acknowledging reception of the last frames transmitted, and acknowledgment will take place utilizing the low-speed fundamental channel (103). In the situation where an interruption occurs, data transmission will continue utilizing a fundamental channel (103) if less than a predetermined amount of data remains to be transmitted.

18 Claims, 7 Drawing Sheets

METHOD AND APPARATUS FOR DATA TRANSMISSION WITHIN A BROAD-BAND COMMUNICATION SYSTEM

FIELD OF THE INVENTION

The present invention relates generally to cellular communication systems and, in particular, to data transmission within a broad-band cellular communication system.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel. To date, the transmissions have typically consisted of voice signals. More recently, however, it has been proposed to carry other forms of signals, including high-speed data signals. For ease of operation, it is preferable to have the data transmission capability overlay the existing voice communication capability, such that its operation is essentially transparent to the voice communication system while still utilizing the communication resources and other infrastructure of the voice communication system.

One such communication system currently being developed with transparent data transmission capabilities is the next generation Code-Division Multiple-Access (CDMA) cellular communication system, more commonly referred to cdma2000. Within such a communication system all remote unit and base station transmissions occur simultaneously within the same frequency band. Therefore, a received signal at a base station or remote unit comprises a multiplicity of frequency and time overlapping coded signals from individual remote units or base stations, respectively. Each of these signals is transmitted simultaneously at the same radio frequency (RF) and is distinguishable only by its specific encoding (channel). In other words, the signal received at a base-station or remote unit receiver is a composite signal of each transmitted signal and an individual signal is distinguishable only after decoding.

Remote unit data transmission within a cdma2000 communication system takes place by assigning the remote unit a high-speed data channel (referred to as a supplemental channel) and transmitting data as discussed above utilizing the supplemental channel. More specifically, when data transmission is requested, a remote unit is immediately assigned a common traffic channel (fundamental channel), and remains on the fundamental channel until a supplemental channel is available. Once available, data transmission occurs utilizing the supplemental channel. Once all data has been transmitted, all the data has been transmitted and acknowledged, or a specified length of time has passed, the supplemental channel is dropped, and the remote unit continues to communicate via the fundamental channel. If all of the data has not been transferred, or if some data needs to be retransmitted (due to receive errors), the supplemental channel must be re-accessed, and the remaining data transmitted.

Because the number of supplemental channels available within a communication system are limited, the ability to quickly re-access a supplemental channel may as well be limited due to several remote units contending for the available supplemental channels. In other words, once a supplemental channel is dropped, the continued transmission/re-transmission of data over a supplemental channel can result in a timely procedure of re-accessing a supplemental channel. The procedure can also take the form of holding the supplemental channel until an acknowledgement of the final data transmission is received. Therefore, a need exists for a method and apparatus for data transmission within a broad-band communication system that allows for faster data transmission and more efficient use of the supplemental channel than with prior-art methods.

DETAILED DESCRIPTION OF THE DRAWINGS

To overcome the problems described above, when data transmission stops, the remote unit will drop the supplemental channel prior to acknowledging reception of the last frames transmitted, and acknowledgment and any retransmission will take place utilizing the low-speed fundamental channel. In the situation where an interruption occurs during supplemental channel transmission, data transmission will continue utilizing a fundamental channel if less than a predetermined amount of data remains to be transmitted. In the case of acknowledgment after data transmission has stopped; because the remote unit will drop the supplemental channel prior to performing any acknowledgment and retransmission, the supplemental channel will be more quickly freed up for use by other data users. Additionally, error control will still be performed without any appreciable delays by utilizing the fundamental channel. In the case of a time-out (or interruption) when utilizing the supplemental channel, because the remote unit will continue transmission of data over the fundamental channel when small amounts of data remain to be transmitted, the transmission of remaining data is not slowed by re-accessing a supplemental channel for the transmission of a small amount of data. Additionally, the supplemental channel will be more quickly freed up for use by other data users.

The present invention encompasses a method for data transmission within a broad-band communication system. The method comprises the steps of transmitting data utilizing a second channel and a second encoding scheme, then receiving an interruption in the transmission of data. The transmission of the data ceases and continues on a first channel with a first encoding scheme.

The present invention additionally encompasses a method for data transmission within a broad-band communication system. The method comprises the steps of transmitting data utilizing a second channel and a second encoding scheme and determining when a plurality of data has been transmitted. Transmission of the data ceases utilizing the second channel and the second encoding scheme when the plurality of data has been transmitted and an acknowledgment of reception of the plurality of data is received. Finally, the plurality of data is retransmitted utilizing a first channel and a first encoding scheme based on the acknowledgment.

The present invention additionally encompasses a method for data transmission within a broad-band communication system. The method comprises the steps of determining that a data transmission needs to take place utilizing a second channel and determining if the second channel is available. Data is transmitted utilizing a first channel and a first encoding scheme when the second channel is unavailable, otherwise transmitting data utilizing the second channel and a second encoding scheme when the second channel is available.

Finally, the present invention encompasses an apparatus for data transmission within a broad-band communication system. The apparatus comprises supplemental channel circuitry outputting data over a high-speed second channel with a second encoding scheme, a controller outputting an indication to stop transmission of data over the second channel with the second encoding scheme, and fundamental channel circuitry outputting the data over a first channel with a first encoding scheme when the data output over the high-speed second channel has been stopped.

Figure 1:
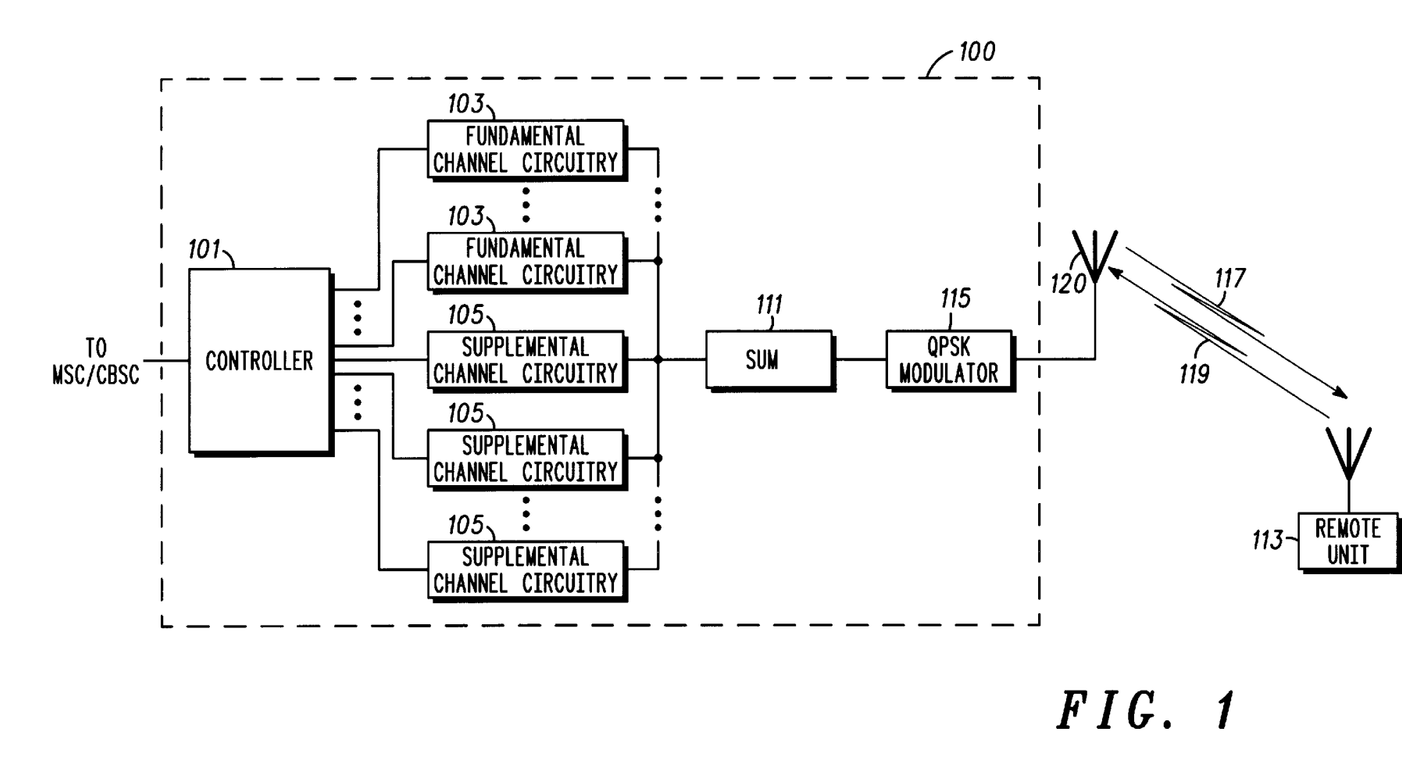
FIG. 1 is a block diagram of a base station for transmitting data in accordance with the preferred embodiment of the present invention.

FIG. 1 is a block diagram of base station 100 for transmitting data to remote unit 113 in accordance with the preferred embodiment of the present invention. Base station 100 comprises controller 101, multiple fundamental channel circuits 103, one or more supplemental channel circuits 105, summer 111, and modulator 115. As shown, base station 100 is communicating to remote unit 113 via downlink communication signal 117, and remote unit 113 is communicating to base station 100 via uplink communication signal 119.

In the preferred embodiment of the present invention, communication to/from remote unit 113 may take place utilizing the supplemental channel circuitry 105 and/or fundamental channel circuitry 103. In particular, base station 100 and remote unit 113 utilize two classes of channels defined for both forward and reverse transmission. The description of the preferred embodiments will be provided with data transmission taking place from base station 100 to remote unit 113, however, one of ordinary skill in the art will recognize that data transmission may take place in a similar manner from remote unit 113 to base station 100 without departing from the spirit and scope of the present invention.

In the preferred embodiment, the fundamental channels are similar to existing CDMA traffic channels and are used for voice, data, and signaling, except spread over a wider bandwidth. CDMA traffic channels are described in detail in Mobile Station-Base Station Compatibility Standards for Dual-Mode Wideband Spread Spectrum Cellular Systems, Telecommunications Industry Association Interim Standard 95A, Washington, DC July 1993 (IS-95A) which is incorporated by reference herein. As described in IS-95A, the transmission rate of this channel may vary dynamically. Additionally, soft handoff (simultaneous communication utilizing more than one fundamental channel circuit 103) is supported utilizing fundamental channel circuitry 103.

In contrast, the supplemental channels are utilized for communicating high data rate services to remote unit 113, with the data rate of the supplemental channels being negotiated prior to transmission. Multiple data sources are time multiplexed on this channel. In addition, the Quality-of-Service (e.g., Frame Error Rate (FER), Bit Error Rate (BER) and/or Transmission Delay) of this channel may be set and operated independently of the fundamental channel.

Data transmission from base station 100 in accordance with the preferred embodiment of the present invention occurs as follows: During time periods where remote unit 113 is not actively communicating to base station 100 utilizing either a fundamental or a supplemental channel, remote unit 113 is in a suspended state, actively or periodically monitoring a forward control channel (IS-95A paging channel) for notification of any pending transmission by base station 100. In particular, paging channel circuitry (not shown) is utilized to send messages to remote unit 113 indicating pending downlink transmissions. In the preferred embodiment of the present invention, paging channels circuitry is circuitry such as described in IS-95A Section 7.1.3.4, 7.6.2 and Section 7.7.2. Base station 100 determines that a high data rate transmission to remote unit 113 needs to take place and determines if supplemental channel circuitry 105 is available for utilization. Due to the limited number of supplemental channels available for communication, a supplemental channel may not be available for transmission to remote unit 113. Because of this, remote unit 113 will be placed in a queue until supplemental channel circuitry 105 is available for transmission. Whether or not remote unit 113 is placed in a queue, remote unit 113 is placed in a "control hold" state where it is assigned a fundamental channel. In particular, base station 100 notifies remote unit 113 of spreading codes (Walsh Codes) utilized by the fundamental and supplemental channels and an assigned data rate of the supplemental channel. Additionally, initial power control takes place at this point utilizing the fundamental channel as described in IS-95A sections 6.1.2 and 6.6.3.1.1.1.

Once at the appropriate power level, and when a supplemental channel becomes available, remote unit 113 enters an active state, where communication utilizing the supplemental channel (i.e., data transmission) occurs. In particular, supplemental channel circuitry 105 assigned to remote unit 113 outputs data to be transmitted to summer 111, where it is summed with other channel transmissions. The resulting summed transmissions are then QPSK modulated by modulator 115, and transmitted to remote unit 113 via downlink communication signal 117.

Transmission on the supplemental channel may stop, inter alia, for two reasons. Firstly, all data has been communicated to remote unit 113. In this situation, remote unit 113 will perform an acknowledgment of the last frames transmitted. In particular, error control takes place either by Acknowledging (ACK) packets that have been received and/or by providing a Negative Acknowledgement (NAK) for messages whose sequence number has not been received even though later numbered messages have been received. (Note that if NAK procedures are used, the successful reception of the last packet must be acknowledged even if the protocol uses NAK only procedures during the rest of the data transmission).

A second reason for ceasing transmission on the supplemental channel is because transmission utilizing the supplemental channel has exceeded an allotted time period (or has simply been interrupted). In this situation data remains to be transmitted to remote unit 113, and remote unit 113 will again be placed in the control hold state awaiting continued data transmission.

In the first situation described above, where all data has been transmitted to remote unit 113, remote unit 113 will drop the supplemental channel prior to acknowledging reception of the last frames transmitted, and acknowledgment will take place utilizing the fundamental channel. In the second situation described above, where a time-out or interruption occurs, data transmission will continue utilizing a fundamental channel if less than a predetermined amount of data remains to be transmitted. In particular, controller 101 will determine the amount of data remaining to be transmitted to remote unit 113, and if there exists less than a predetermined amount of data that needs to be transmitted to remote unit 113, transmission will continue over a fundamental channel, otherwise, transmission of data will continue over the supplemental channel when the supplemental channel again becomes available.

In the case of acknowledgment after data transmission has stopped; because remote unit 113 will drop the supplemental channel prior to performing any error control, the supplemental channel will be more quickly freed up for use by other data users. Additionally, error control will still be performed without any appreciable delays by utilizing the fundamental channel. In the case of a timeout (or interruption) when utilizing the supplemental channel, because remote unit 113 will continue transmission of data over the fundamental channel when small amounts of data remain to be transmitted, the transmission of remaining data is not slowed by re-accessing a supplemental channel for the transmission of a small amount of data. Additionally, the supplemental channel will be more quickly freed up for use by other data users.

Figure 2:
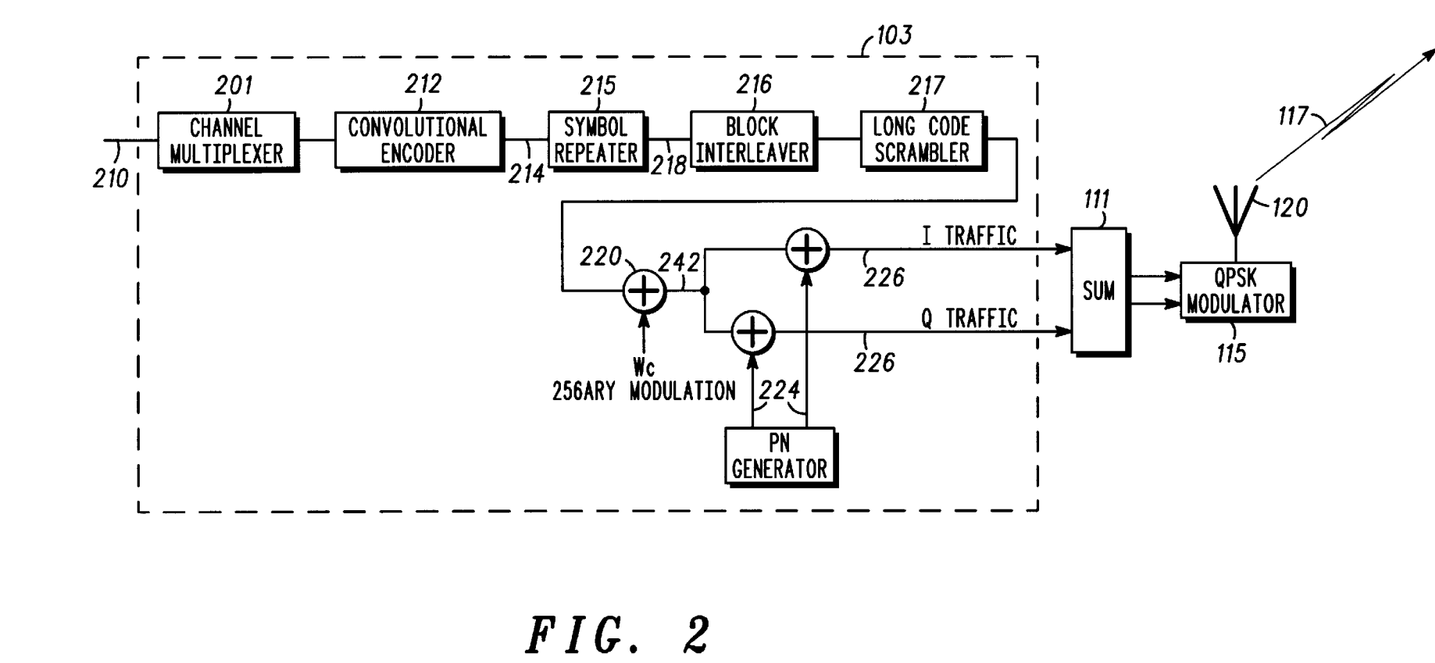
FIG. 2 is a block diagram of fundamental channel circuitry of FIG. 1 in accordance with the preferred embodiment of the present invention.

FIG. 2 is a block diagram of fundamental channel circuitry of FIG. 1 in accordance with the preferred embodiment of the present invention. Fundamental channel circuitry 103 includes channel multiplexer 201, convolutional encoder 212, symbol repeater 215, block interleaver 216, long code scrambler 217, and orthogonal encoder 220. During operation, signal 210 (traffic channel data bits) is received by channel multiplexer 201 at a particular bit rate (e.g., 8.6 kbit/second). Input traffic channel data 210 bits typically include voice converted to data by a vocoder, pure data, or a combination of the two types of data. Channel multiplexer 201 multiplexes secondary traffic (e.g., data), and/or signaling traffic (e.g. control or user messages) onto the traffic channel data 210 and outputs the multiplexed data at 9.6 kbit/sec to convolutional encoder 212. Convolutional encoder 212 encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 212 encodes input data bits 210 (received at a rate of 9.6 kbit/second) at a fixed encoding rate of one data bit to two data symbols (i.e., rate ⅓) such that convolutional encoder 212 outputs data symbols 214 at a 28.8 ksymbol/second rate.

Data symbols 214 are then repeated by repeater 215 and input into interleaver 216. Interleaver 216 interleaves the input data symbols 214 at the symbol level. In interleaver 216, data symbols 214 are individually input into a matrix which defines a predetermined size block of data symbols 214. Data symbols 214 are input into locations within a matrix so that the matrix is filled in a column by column manner. Data symbols 214 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 218 are output by interleaver 216 at the same data symbol rate that they were input (e.g., 28.8 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 28.8 ksymbol/second times 20 milliseconds which equals 576 data symbols which defines a 18 by 32 matrix.

Interleaved data symbols 218 are scrambled by scrambler 217 and output to orthogonal encoder 220. Orthogonal encoder 220 modulo 2 adds an orthogonal code (e.g., a 256-ary Walsh code) to each interleaved and scrambled data symbol 218. For example, in 256-ary orthogonal encoding, interleaved and scrambled data symbols 218 are each exclusive OR'd by a 256 symbol orthogonal code. These 256 orthogonal codes preferably correspond to Walsh codes from a 256 by 256 Hadamard matrix wherein a Walsh code is a single row or column of the matrix. Orthogonal encoder 220 repetitively outputs a Walsh code which corresponds to input data symbol 218 at a fixed symbol rate (e.g., 28.8 ksymbol/second).

Sequence of Walsh codes 242 are further spread by a pair of short pseudorandom codes 224 (i.e. short when compared to the long code) to generate an I-channel and Q-channel code spread sequence 226. The I-channel and Q-channel code spread sequences 226 are used to bi-phase modulate a quadrature pair of sinusoids by driving the power level controls of the pair of sinusoids. The sinusoids output signals are summed, QPSK modulated (by modulator 115) and radiated by antenna 120 to complete transmission of channel data bits 210. In the preferred embodiment of the present invention, spread sequences 226 are output at a rate of 3.6864 Mega Chips per second (Mcps) and radiated within a 5 MHz bandwidth, but in alternate embodiments of the present invention, spread sequences 226 may be output at a different rate and radiated within a different bandwidth. For example, in an alternate embodiment of the present invention an IS-95A transmission scheme may be utilized where spread sequences 226 are output at a rate of 1.2288 Mcps (traffic channel chip rate) within a 1.25 MHz bandwidth. Because each data symbol is exclusive OR'd by a 128 symbol orthogonal code, the actual input data symbol transmission rate (at step 218) is 19.2 Kcps (utilizing a ½ convolutional encoder).

Figure 3:
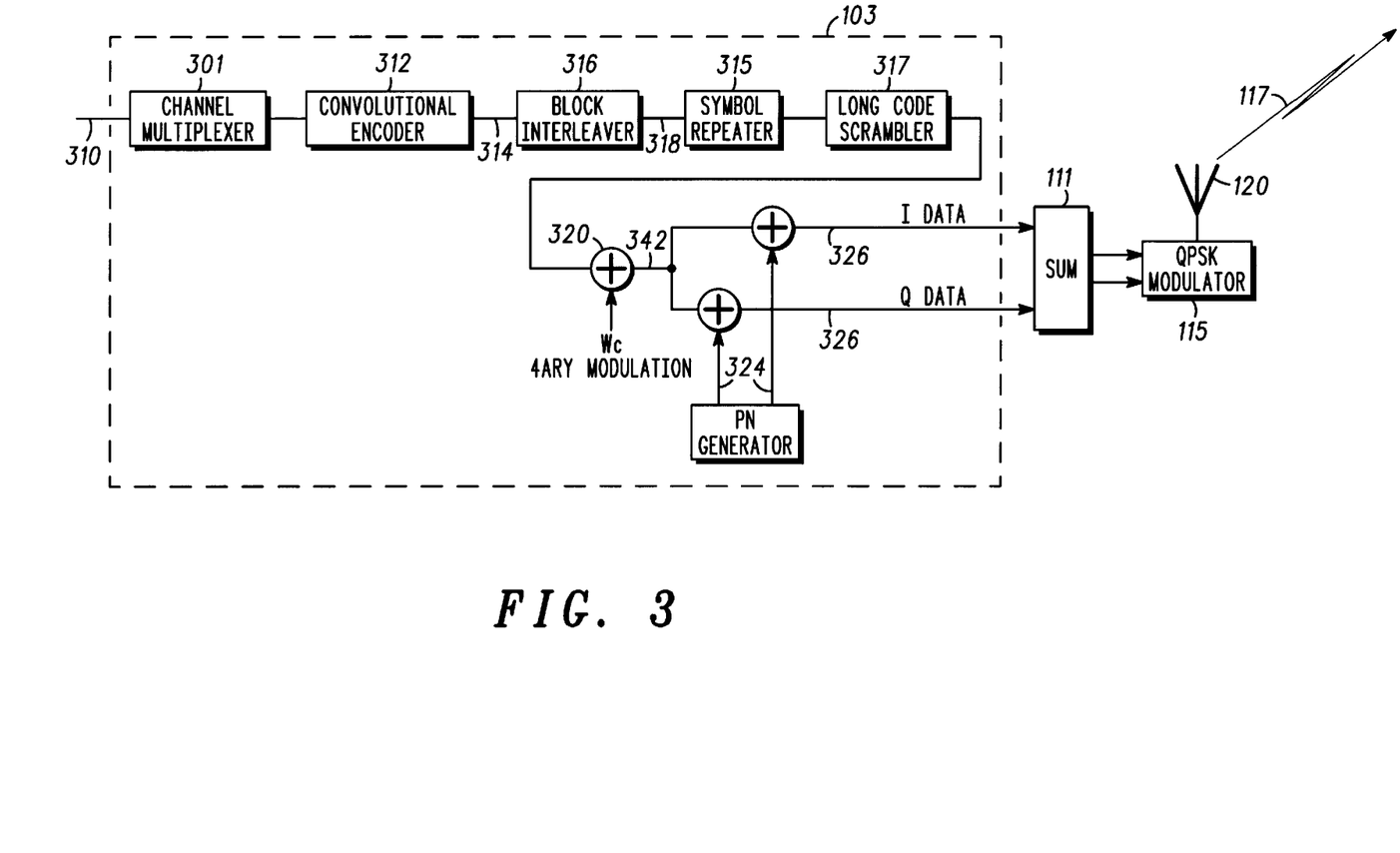
FIG. 3 is a block diagram of supplemental channel circuitry of FIG. 1 for transmitting data in accordance with the preferred embodiment of the present invention.

FIG. 3 is a block diagram of supplemental channel circuitry 105 of FIG. 1 for transmitting data in accordance with the preferred embodiment of the present invention. Supplemental channel circuitry 105 includes channel multiplexer 301, convolutional encoder 312, symbol repeater 315, block interleaver 316, and orthogonal encoder 320. During operation, signal 310 (data) is received by channel multiplexer 301 at a particular bit rate (e.g., 152.4 kbit/second). Channel multiplexer 301 multiplexes secondary traffic (e.g., user data) onto the supplemental channel data 310 and outputs the multiplexed data to convolutional encoder 312 at 153.6 kb/s.

Convolutional encoder 312 encodes input data bits 310 into data symbols at a fixed encoding rate with an encoding algorithm which facilitates subsequent maximum likelihood decoding of the data symbols into data bits (e.g. convolutional or block coding algorithms). For example, convolutional encoder 312 encodes input data bits 310 (received at a rate of 153.6 kbit/second) at a fixed encoding rate of one data bit to two data symbols (i.e., rate ⅓) such that convolutional encoder 312 outputs data symbols 314 at a 460.8 kbit/second rate.

Data symbols 314 are then input into interleaver 316. Interleaver 316 interleaves the input data symbols 314 at the symbol level. In interleaver 316, data symbols 314 are individually input into a matrix which defines a predetermined size block of data symbols 314. Data symbols 314 are input into locations within a matrix so that the matrix is filled in a column by column manner. Data symbols 314 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 318 are output by interleaver 316 at the same data symbol rate that they were input (e.g., 460.8 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 9.216 ksymbols.

Interleaved data symbols 318 are repeated by repeater 315 and output to orthogonal encoder 320. Orthogonal encoder 320 modulo 2 adds an orthogonal code (e.g., a 16-ary Walsh code) to each interleaved and scrambled data symbol 318. For example, in 16-ary orthogonal encoding, interleaved and scrambled data symbols 318 are each exclusive OR'd by a 16 symbol orthogonal code. These 16 orthogonal codes preferably correspond to Walsh codes from a 16 by 16 Hadamard matrix wherein a Walsh code is a single row or column of the matrix. Orthogonal encoder 320 repetitively outputs a Walsh code or its inverse which corresponds to input data symbol 318 at a fixed symbol rate (e.g., 460.8 ksymbol/second).

Sequence of weighted Walsh codes 342 are further spread by a pair of short pseudorandom codes 324 (i.e. short when compared to the long code) to generate an I-channel and Q-channel code spread sequence 326. The I-channel and Q-channel code spread sequences 326 are used to bi-phase modulate a quadrature pair of sinusoids by driving the power level controls of the pair of sinusoids. The sinusoids output signals are summed, QPSK modulated (by modulator 115) and radiated by antenna 120 to complete transmission of channel data bits 310. In the preferred embodiment of the present invention, spread sequences 326 are output at 3.6864 Mcps and radiated within a 5 MHz bandwidth.

Figure 4:
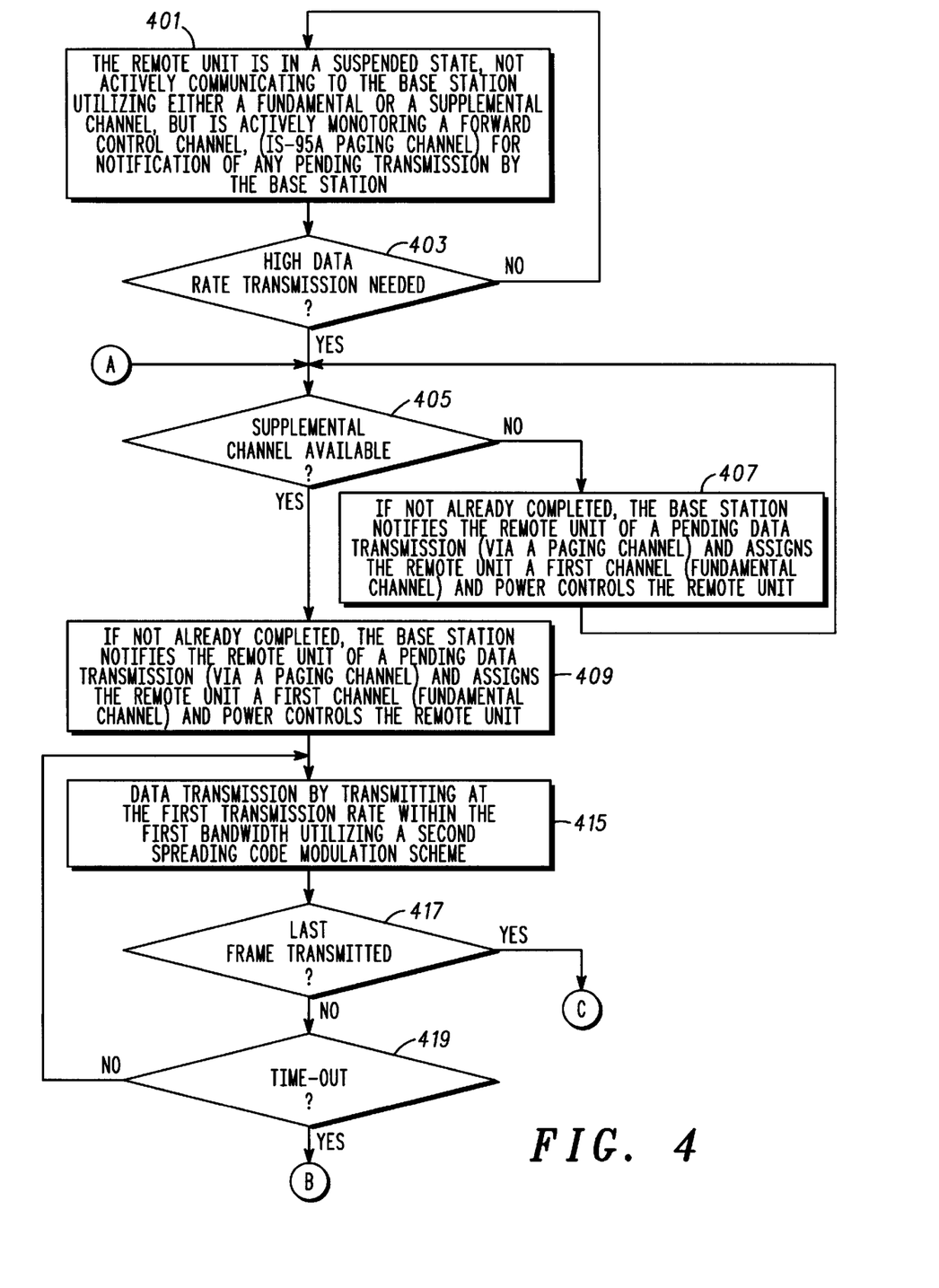
FIGS. 4 and 5 are a flow chart illustrating transmission of data from the base station of FIG. 1 in accordance with the preferred embodiment of the present invention.

FIG. 4 is a flow chart illustrating transmission of data from the base station of FIG. 1 in accordance with the preferred embodiment of the present invention. In the preferred embodiment of the present invention, data transmission from base station 100 to remote unit 113 is accomplished utilizing a second (supplemental) channel, however, unlike prior-art methods of data transmission, the supplemental channel is dropped prior to all data being successfully transferred via the supplemental channel. In particular, in the preferred embodiment of the present invention, acknowledgment and retransmission of data occurs utilizing a fundamental channel. Additionally, when a time-out, or interruption occurs during data transmission, the supplemental channel is dropped, and data transmission continues over the fundamental channel.

The logic flow begins at step 401 where remote unit 113 is in a suspended state, not actively communicating to base station 100 utilizing either a fundamental or a supplemental channel, but is actively monitoring a forward control channel, (IS-95A paging channel) for notification of any pending transmission by base station 100. As described above, paging channel circuitry (not shown) is utilized to send messages to remote unit 113 indicating pending downlink transmissions. At step 403 controller 101 determines if a high data rate transmission to remote unit 113 needs to take place. If, at step 403 controller 101 determines that a high data rate transmission does not need to take place, then the logic flow returns to step 403, otherwise the logic flow continues to step 405. At step 405 controller 101 determines if supplemental channel circuitry 105 is available for utilization, and if so, the logic flow continues to step 407 where, if not already completed, base station 100 notifies remote unit 113 of a pending data transmission (via a paging channel) and assigns remote unit 113 a first channel (fundamental channel) and power controls remote unit 113. The logic flow then returns to step 405. If, at step 405, controller 101 determines that supplemental channel circuitry 105 is available for utilization, the logic flow continues to step 409 where, if not already completed, base station 100 notifies remote unit 113 of a pending data transmission (via a paging channel), assigns remote unit 113 the first channel (fundamental channel) and power controls remote unit 113.

At step 415 data transmission utilizing a second channel (supplemental channel) takes place. In particular, data transmission begins by transmitting at the first transmission rate (3.6864 Mcps) within the first bandwidth (5 MHz) utilizing a second orthogonal encoding scheme (second-ary, or in the preferred embodiment of the present invention, a 16-ary encoding scheme). At step 417, controller 101 determines if the last frame (packet) of data has been transmitted to remote unit 113, and if so, the logic flow continues to step 421, otherwise the logic flow continues to step 419 where controller 101 determines if a time-out, or interruption occurred, causing data transmission to cease. At step 421, transmission on the supplemental channel stops, (i.e., the channel is dropped) and at step 423 an acknowledgment of the last frames transmitted (plurality of data transmitted) is received from remote unit 113, indicating if retransmission of any data needs to occur. In the preferred embodiment of the present invention, the acknowledgment is performed by remote unit 113 by transmitting the acknowledgment to base station 100 utilizing the fundamental channel. The logic flow continues to step 425 where controller 101 determines if data needs to be retransmitted to remote unit 113, and if so, the logic flow continues to step 427, otherwise the logic flow ends at step 429. At step 427, controller 101 transmits data to remote unit 113 via the fundamental channel (i.e., transmitting at the first transmission rate (3.6864 Mcps) within the first bandwidth (5 MHz) utilizing the first orthogonal encoding scheme (first-ary, or in the preferred embodiment of the present invention, a 256-ary encoding scheme). The logic flow then ends at step 429.

Returning to step 419, if controller 101 determines that a "time out" has occurred, the logic flow continues to step 431 where an amount of data remaining to be transmitted to remote unit 113 is determined, otherwise the logic flow returns to step 415. Next, at step 433, controller 101 determines if the amount of data that remains to be transmitted is greater than a predetermined threshold (e.g., 5 frames), and if so the logic flow returns to step 405, otherwise the logic flow continues to step 427.

As discussed above, by completing transmission of data over the fundamental channel, the supplemental channel will be more quickly freed up for use by other data users. Additionally, error control will still be performed without any appreciable delays by utilizing the fundamental channel.

Figure 5:
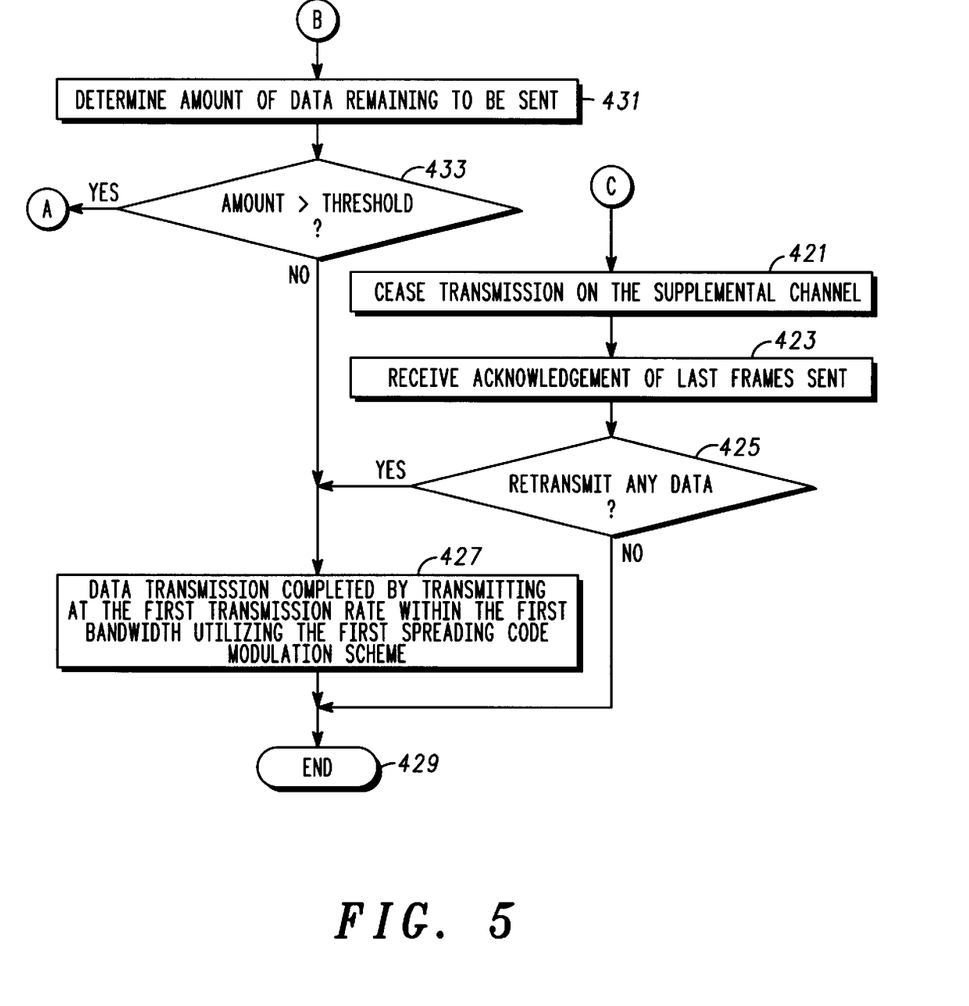
Figure 6:
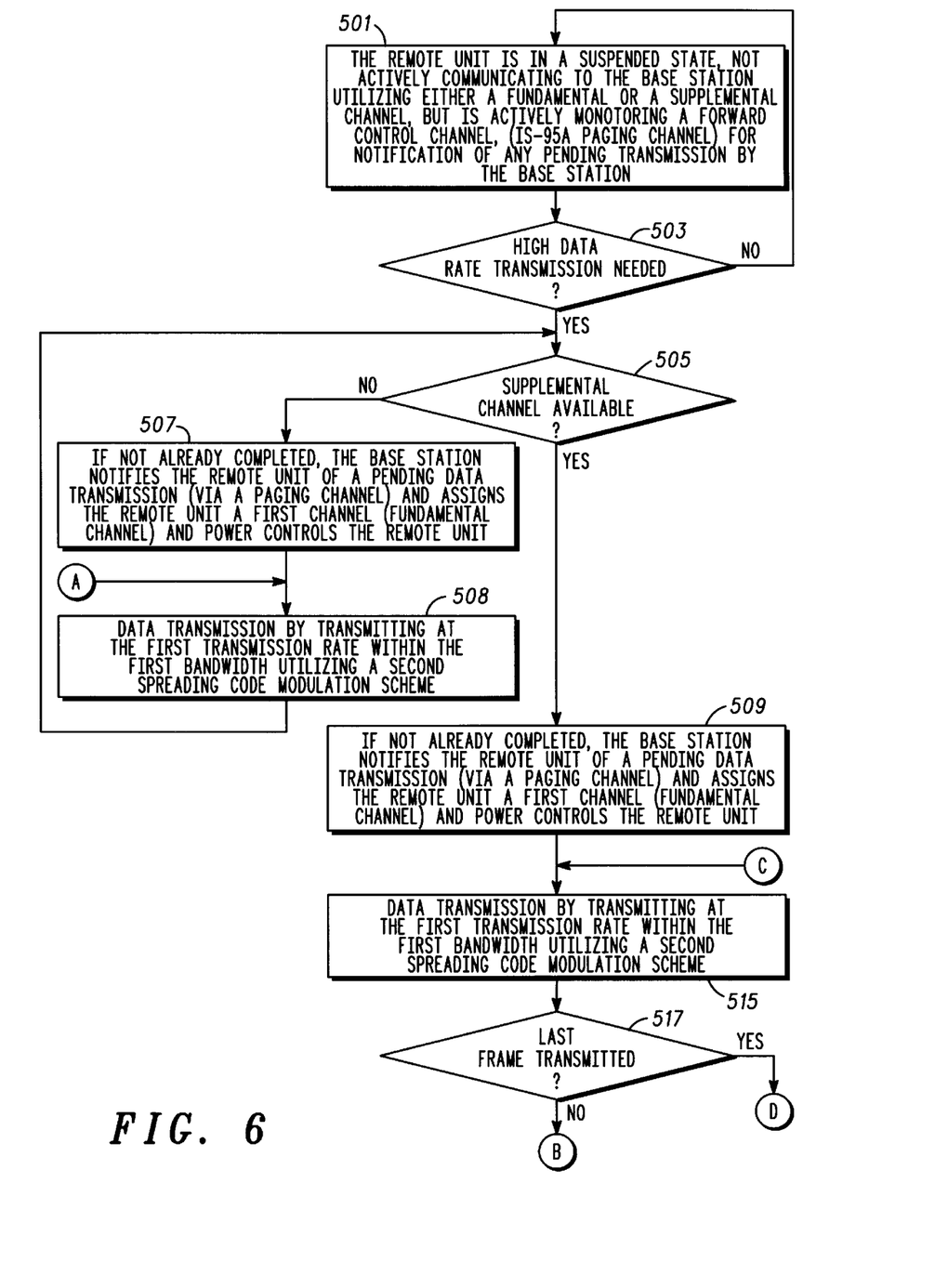
FIGS. 6 and 7 are a flow chart illustrating transmission of data from the base station of FIG. 1 in accordance with an alternate embodiment of the present invention.
Figure 7:
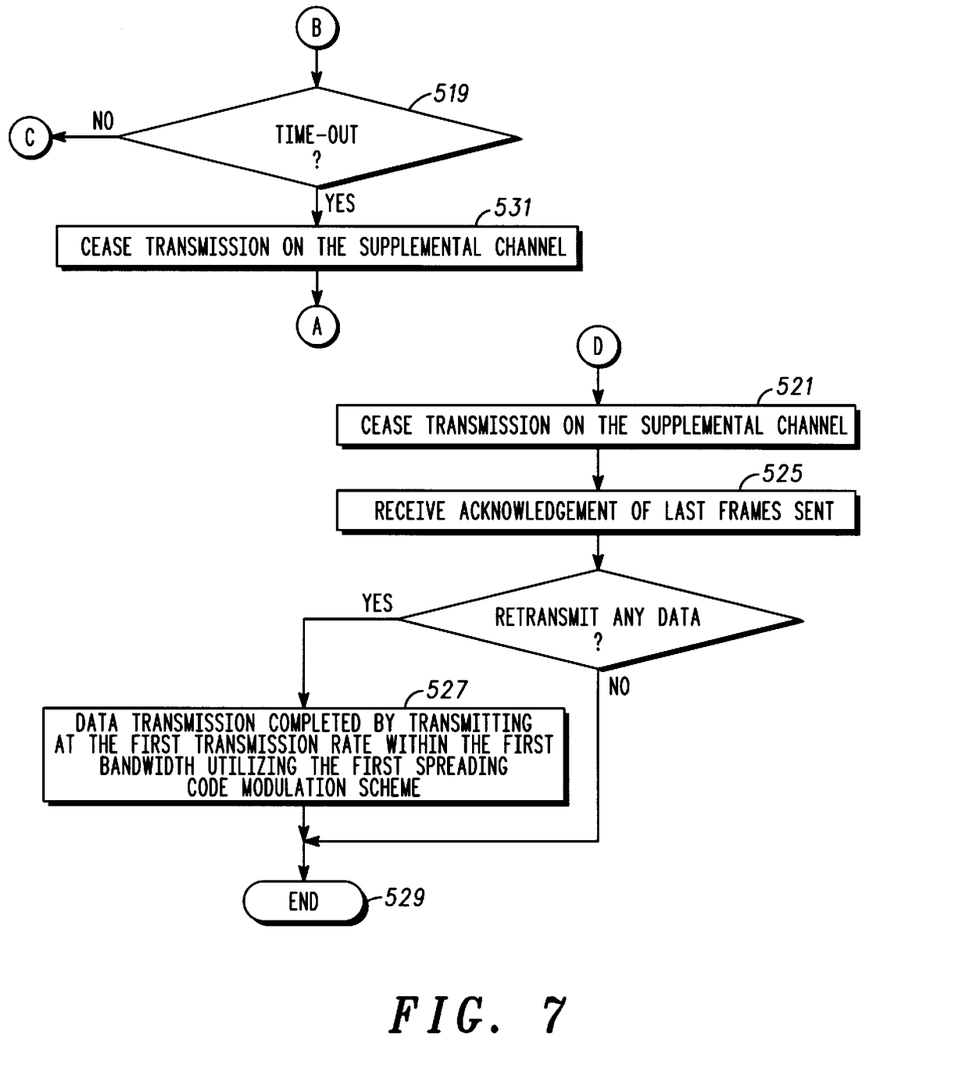

FIG. 5 is a flow chart illustrating transmission of data from the base station of FIG. 1 in accordance with an alternate embodiment of the present invention. In the alternate embodiment of the present invention, data transmission takes place whenever data needs to be transmitted to remote unit 113, whether or not supplemental channel circuitry 105 is available for utilization. More particularly, a determination is made if a second channel (supplemental channel) is available, ad data is transmitted using a first channel (fundamental channel) when the supplemental channel is unavailable, otherwise data is transmitted using the supplemental channel.

The logic flow begins at step 501 where remote unit 113 is in a suspended state, not actively communicating to base station 100 utilizing either a fundamental or a supplemental channel, but is actively monitoring a forward control channel, (IS-95A paging channel) for notification of any pending transmission by base station 100. As described above, paging channel circuitry (not shown) is utilized to send messages to remote unit 113 indicating pending downnlink transmissions. At step 503 controller 101 determines if a high data rate transmission to remote unit 113 needs to take place. If at step 503 controller 101 determines that a high data rate transmission does not need to take place, then the logic flow returns to step 503, otherwise the logic flow continues to step 505. At step 505 controller 101 determines if supplemental channel circuitry 105 is available for utilization, and if so, the logic flow continues to step 507 where, if not already completed, base station 100 notifies remote unit 113 of a pending data transmission (via a paging channel) and assigns remote unit 113 a first channel (fundamental channel) and power controls remote unit 113. Next, at step 508, data transmission takes place via a first channel (the fundamental channel) by transmitting at the first transmission rate (3.6864 Mcps) within the first bandwidth (5 MHz) utilizing the first orthogonal encoding scheme (first-ary, or in the preferred embodiment of the present invention, a 256-ary encoding scheme). The logic flow then returns to step 505. If, at step 505, controller 101 determines that supplemental channel circuitry 105 is available for utilization, the logic flow continues to step 509 where, if not already completed, base station 100 notifies remote unit 113 of a pending data transmission (via a paging channel), assigns remote unit 113 the first channel (fundamental channel) and power controls remote unit 113.

At step 515 data transmission utilizing a second channel (supplemental channel) takes place. In particular, data transmission begins by transmitting at the first transmission rate (3.6864 Mcps) within the first bandwidth (5 MHz) utilizing a second orthogonal encoding scheme (second-ary, or in the preferred embodiment of the present invention, a 16-ary encoding scheme). At step 517, controller 101 determines if the last frame (packet) of data has been transmitted to remote unit 113, and if so, the logic flow continues to step 521, otherwise the logic flow continues to step 519 where controller 101 determines if a time-out, or interruption occurred. At step 521, transmission on the supplemental channel stops, (i.e., the channel is dropped) and at step 523 an acknowledgment of the last frames transmitted is received from remote unit 113, indicating if retransmission of any data needs to occur. In the preferred embodiment of the present invention, the acknowledgment is performed by remote unit 113 by transmitting the acknowledgment to base station 100 utilizing the fundamental channel. The logic flow continues to step 525 where controller 101 determines if data needs to be retransmitted to remote unit 113, and if so, the logic flow continues to step 527, otherwise the logic flow ends at step 529. At step 527, controller 101 transmits data to remote unit 113 via the fundamental channel (i.e., transmitting at the first transmission rate (3.6864 Mcps) within the first bandwidth (5 MHz) utilizing the first orthogonal encoding scheme (first-ary, or in the preferred embodiment of the present invention, a 256-ary encoding scheme). The logic flow then ends at step 529.

Returning to step 519, if controller 101 determines that a "time out" has occurred, the logic flow continues to step 531 where transmission on the supplemental channel stops and the logic flow returns to step 508 where data transmission continues via the fundamental channel. If at step 519, controller 101 determines that a "time out" has not occurred, the logic flow the logic flow returns to step 515. Because data transmission occurs over the fundamental channel whenever a supplemental channel is unavailable, the amount of data transmitted to remote unit 113 is increased when compared to prior-art methods of data transmission.

While the invention has been particularly shown and described with reference to a particular embodiment, it will be understood by those skilled in the art that various changes in form and details may be made therein without departing from the spirit and scope of the invention and it is intended that all such changes come within the scope of the following claims:

What is claimed is:

1. A method for data transmission within a broad-band communication system, the method comprising the steps of:

transmitting data utilizing a second channel and a second encoding scheme;

receiving an interruption in the transmission of data utilizing the second channel and the second encoding scheme;

ceasing transmission of the data utilizing the second channel and the second encoding scheme; and continuing transmission of the data utilizing a first channel and a first encoding scheme.

2. The method of claim 1 further comprising the steps of:

determining an amount of data remaining to be transmitted after receiving the interruption; and continuing transmission of the data utilizing the first channel and the first encoding scheme when the amount of data remaining to be transmitted is below a threshold.

3. The method of claim 1 wherein the step of transmitting data utilizing the second channel and the second encoding scheme comprises the step of transmitting data utilizing the second channel and a second-ary encoding scheme.

4. The method of claim 3 wherein the step of continuing transmission of the data utilizing the first channel and the first encoding scheme comprises the step of transmitting data utilizing the first channel and a first-ary encoding scheme.

5. The method of claim 1 further comprising the steps of:

determining when the second channel becomes available after receiving the interruption; and continuing transmission of the data utilizing the second channel and the second encoding scheme when the second channel becomes available.

6. The method of claim 1 wherein the step of transmitting the data utilizing the first channel, and transmitting the data utilizing the second channel comprises the steps of transmitting the data utilizing a lower-speed data channel, and transmitting the data utilizing a higher-speed data channel, respectively.

7. A method for data transmission within a broad-band communication system, the method comprising the steps of:

transmitting data utilizing a second channel and a second encoding scheme;

determining when a plurality of data has been transmitted;

ceasing transmission of the data utilizing the second channel and the second encoding scheme when the plurality of data has been transmitted; and receiving an acknowledgment of reception of the plurality of data; and re-transmitting the plurality of data utilizing a first channel and a first encoding scheme based on the acknowledgment.

8. The method of claim 7 wherein the step of determining when the plurality of data has been transmitted comprises the step of determining when a last frame of data has been transmitted.

9. The method of claim 7 wherein the step of transmitting data utilizing the second channel and the second encoding scheme comprises the step of transmitting data utilizing a second channel and a second-ary encoding scheme.

10. The method of claim 9 wherein the step of re-transmitting the plurality of data utilizing the first channel and the first encoding scheme comprises the step of transmitting data utilizing the first channel and a first-ary encoding scheme.

11. The method of claim 7 wherein the step of re-transmitting the data utilizing the first channel, and transmitting the data utilizing the second channel comprises the steps of transmitting the data utilizing a lower-speed data channel, and transmitting the data utilizing a higher-speed data channel, respectively.

12. A method for data transmission within a broad-band communication system, the method comprising the steps of:

determining that a data transmission needs to take place utilizing a second channel;

determining if the second channel is available; and transmitting data utilizing a first channel and a first encoding scheme when the second channel is unavailable, otherwise transmitting data utilizing the second channel and a second encoding scheme when the second channel is available.

13. The method of claim 12 wherein the step of transmitting data utilizing the second channel and the second encoding scheme comprises the step of transmitting data utilizing the second channel and a second-ary encoding scheme.

14. The method of claim 13 wherein the step of continuing transmission of the data utilizing the first channel and the first encoding scheme comprises the step of transmitting data utilizing the first channel and a first-ary encoding scheme.

15. The method of claim 12 wherein the step of transmitting the data utilizing the first channel, and transmitting the data utilizing the second channel comprises the steps of transmitting the data utilizing a lower-speed data channel, and transmitting the data utilizing a higher-speed data channel, respectively.

16. An apparatus for data transmission within a broad-band communication system, the apparatus comprising:

supplemental channel circuitry outputting data over a high-speed second channel with a second encoding scheme;

a controller outputting an indication to stop transmission of data over the second channel with the second encoding scheme; and fundamental channel circuitry outputting the data over a first channel with a first encoding scheme when the data output over the high-speed second channel has been stopped.

17. The apparatus of claim 16 wherein the supplemental channel circuitry transmits data utilizing a second-ary encoding scheme.

18. The method of claim 17 wherein the fundamental channel circuitry transmits data utilizing a first-ary encoding scheme.

* * * * *